(12) United States Patent
Grivas et al.

(10) Patent No.: US 6,903,724 B2
(45) Date of Patent: Jun. 7, 2005

(54) HANDHELD COMMUNICATIONS DEVICES WITH JOYSTICKS AND SWITCH CONTACT LAYOUTS THEREFOR

(75) Inventors: Chris J. Grivas, Crystal Lake, IL (US); Michael F. Brletich, Lake Forest, IL (US); William Lee, Libertyville, IL (US)

(73) Assignee: Motorola, Inc., Schaumburg, IL (US)

( * ) Notice: Subject to any disclaimer, the term of this patent is extended or adjusted under 35 U.S.C. 154(b) by 514 days.

(21) Appl. No.: 09/733,797

(22) Filed: Dec. 8, 2000

(65) Prior Publication Data

US 2002/0070918 A1 Jun. 13, 2002

(51) Int. Cl.[7] ................................................ G09G 5/08
(52) U.S. Cl. ..................................................... 345/161
(58) Field of Search ................................. 345/157, 161, 345/156; 200/5 R, 5 A, 6 A, 4; 338/114; 341/20

(56) References Cited

U.S. PATENT DOCUMENTS

| | | | | |
|---|---|---|---|---|
| 3,731,013 A | * | 5/1973 | Nightengale | 200/4 |
| 4,408,103 A | * | 10/1983 | Smith, III | 200/6 A |
| 4,433,217 A | * | 2/1984 | Griffith | 200/5 R |
| 5,555,004 A | * | 9/1996 | Ono et al. | 345/161 |
| 5,657,012 A | * | 8/1997 | Tait | 341/20 |
| 5,889,507 A | * | 3/1999 | Engle et al. | 345/161 |
| 5,900,829 A | | 5/1999 | Gardner et al. | |
| 5,949,325 A | * | 9/1999 | Devolpi | 200/6 A |
| 5,982,355 A | * | 11/1999 | Jaeger et al. | 345/161 |
| 6,184,866 B1 | * | 2/2001 | Schrum et al. | 345/157 |
| 6,201,534 B1 | * | 3/2001 | Steele et al. | 345/157 |
| 6,236,034 B1 | * | 5/2001 | DeVolpi | 200/6 A |
| 6,252,582 B1 | * | 6/2001 | Rogers et al. | 345/156 |
| 6,256,012 B1 | * | 7/2001 | Devolpi | 345/156 |
| 6,313,826 B1 | * | 11/2001 | Schrum et al. | 200/5 A |
| 6,377,239 B1 | * | 4/2002 | Isikawa | 200/5 R |
| 6,404,323 B1 | * | 6/2002 | Schrum et al. | 338/114 |
| 6,411,275 B1 | * | 6/2002 | Hedberg | 345/156 |
| 6,486,871 B1 | * | 11/2002 | Marten | 345/157 |

OTHER PUBLICATIONS

Matt Barker, "*Varatouch Technology Develops Minature Joystick*", NewsWire—Bit Blasts, Jul. 23, 1999, vol. 3: Issue 29.

*Joystick fits tight spots in PDSa, laptops*, EETimes—Section: Product Week—Components, Jul. 26, 1999, Issue: 1071.

*ZiLOG, Varatouch Partner To Produce Innovative Human Interface Solutions For Consumers*, News.excite.com, update 8:31 AM ET Jul. 7, 1999.

*Rubber Technology Redefines Electronics Manufacturing*, Electronic Design Online—Electronic Design, Oct. 12, 1998.

*Are mouse's days numbered?*, MSNBC online—Technology News from ZDNN, Dec. 29.

Christopher Jones, *Unseating the Mouse*, Wired News updated 2:30 PM Mar. 99 PST.

(Continued)

Primary Examiner—Steven Saras
Assistant Examiner—Uchendu O. Anyaso
(74) Attorney, Agent, or Firm—Roland K. Bowler, II

(57) ABSTRACT

An electronic device, for example a handheld telephone, having an integrated joystick with a conductive contact surface disposed toward a printed circuit board (PCB). The joystick is aligned with a neutral position contact portion of the PCB when the joystick is in a neutral position. A joystick contact region of the PCB has a plurality of directional contacts disposed circumferentially around the neutral position portion, corresponding to different joystick input directions. The conductive portion of the joystick electrically interconnects a ground contact with a corresponding one of the directional switch contacts when the joystick is pivoted in a corresponding input direction.

34 Claims, 11 Drawing Sheets

OTHER PUBLICATIONS

Sami Mesefee, *Varatouch Presents The Orb, A Rodent Alternative*, Newsbytes, Dec. 22, 1998, $:36 PM CST.
$R^2$ Resistive Robber—Technology.
$R^2$ Resistive Robber—Technology—Galaxy.
MicroPoint, www.ecnmag.com, vol. 43, No. 6, Jun. 1999.
Michael J. Martinez, *Building a Better Mouse*, ABCNEWS.com tech archive published Sep. 25, 1998.
Varatouch Technology Inc., Press Release, Sep. 2, 1998.
Varatouch Technology Inc., Press Release, Dec. 21, 1998.
Varatouch Technology Inc., Press Release, Jul. 6, 1999.
Varatouch Technology Inc., Press Release, Jul. 13, 1999.
Varatouch Technology Inc., Press Release, Oct. 4, 1999.
Varatouch Technology Inc., "Technology Analysis", 24 pgs.

* cited by examiner

HANDHELD COMMUNICATIONS DEVICES WITH JOYSTICKS AND SWITCH CONTACT LAYOUTS THEREFOR

BACKGROUND OF THE INVENTION

The present invention relates generally to electronic devices with joysticks, and more particularly to handheld communications devices having integrated joysticks.

Thumb wheel input devices are known on cellular handsets, for example the Sony "JOG DIAL". These devices however provide only limited input control for menu selection, scrolling and other input operations.

An object of the present invention is to provide novel electronic devices, for example handheld communications devices, and inputs therefor that overcome problems in and improve upon the prior art.

Another object of the invention is to provide in some embodiments thereof novel electronic devices and inputs therefor that are economical.

A further object of the invention is to provide in some embodiments thereof novel electronic devices having integrated joystick inputs using the existing input software.

Another object of the invention is to provide in some embodiments thereof novel electronic devices and inputs therefore having improved reliability.

Another object of the invention is to provide in some embodiments thereof novel electronic devices, including handheld communications and portable electronic devices, having integrated joysticks with low profiles.

A general object of the invention is to provide in some embodiments thereof novel handheld telephones, for example cellular telephones, having integrated joysticks.

Yet another object of the invention is to provide in some embodiments thereof novel electronic devices, including handheld communications and portable electronic devices, having improved joystick switch contact layouts.

Still another object of the invention is to provide in some embodiments thereof novel electronic devices, including handheld communications and portable electronic devices, having integrated joysticks that use less power.

Another object of the invention is to provide in some embodiments thereof novel electronic devices, including handheld communications and portable electronic devices, having joysticks controlled by existing keypad software.

A further object of the invention is to provide in some embodiments thereof novel electronic devices, including handheld communications and portable electronic devices, having joysticks with an at least partially resilient conductive portion for closing switch contacts on a support member, for example on a printed circuit board (PCB) of the device.

Still another object of the invention is to provide in some embodiments thereof novel electronic devices, including handheld communications and portable electronic devices, having joysticks with joystick contact layouts that enable diagonal directional inputs.

Still another object of the invention is to provide in some embodiments thereof novel electronic devices, including handheld communications and portable electronic devices, having joysticks that emulate mouse-like pointer-movement functionality.

Yet another object of the invention is to provide in some embodiments thereof novel electronic devices, including handheld communications and portable electronic devices, having joysticks with inputs actuated upon axially depressing the joystick.

Another object of the invention is to provide in some embodiments thereof novel electronic devices, including handheld communications and portable electronic devices, having joysticks inputs that replace prior art keypad inputs.

It is also an object of the invention to provide in some embodiments thereof novel electronic devices, including handheld communications and portable electronic devices, having joystick switch contacts that remain open when the joystick is in the neutral position.

Still another object of the invention is to provide in some embodiments thereof novel electronic devices, including handheld communications and portable electronic devices, having joystick and contact layouts therefore that are fabricated on existing device PCBs.

A more particular object of the invention is to provide in some embodiments thereof novel electronic devices comprising a joystick pivotally coupled to the device, a conductive end portion of the joystick disposed toward a support member, for example a printed circuit board of the device, a plurality of switch contact sets disposed on the support member, circumferentially about a neutral position portion thereof.

Another more particular object of the invention is to provide in some embodiments thereof novel handheld telephones comprising a joystick pivotally coupled thereto, an end portion of the joystick disposed toward a support member housed within the telephone and aligned with a neutral position portion thereof when the joystick is in a neutral position, the telephone having joystick activated inputs located at N, S, E and W positions disposed about the joystick neutral position, whereby the inputs are activated by pivoting the joystick in a corresponding joystick input direction.

Another more particular object of the invention is to provide in some embodiments thereof novel electronic apparatus joystick contact layouts comprising a plurality of electrically isolated directional switch contacts disposed on a PCB, the plurality of directional input switch contacts disposed circumferentially about a neutral position portion of the PCB, and a ground contact disposed on the PCB.

These and other object, features and advantages of the present invention will become more fully apparent to those having ordinary skill in the art upon careful consideration of the following Detailed Description of the Invention and the accompanying drawings described below.

DETAILED DESCRIPTION OF THE INVENTION

The invention relates generally to joysticks and switch contact layouts therefor and the integration thereof in electronic devices, including handheld communications devices, for example pagers, cellular and wireless telephones, personal digital assistants (PDAs), among other devices. The joysticks and switch contact layouts of the invention may also be integrated into other electronic devices, including notebook computers, handheld games, etc.

Figure 1:
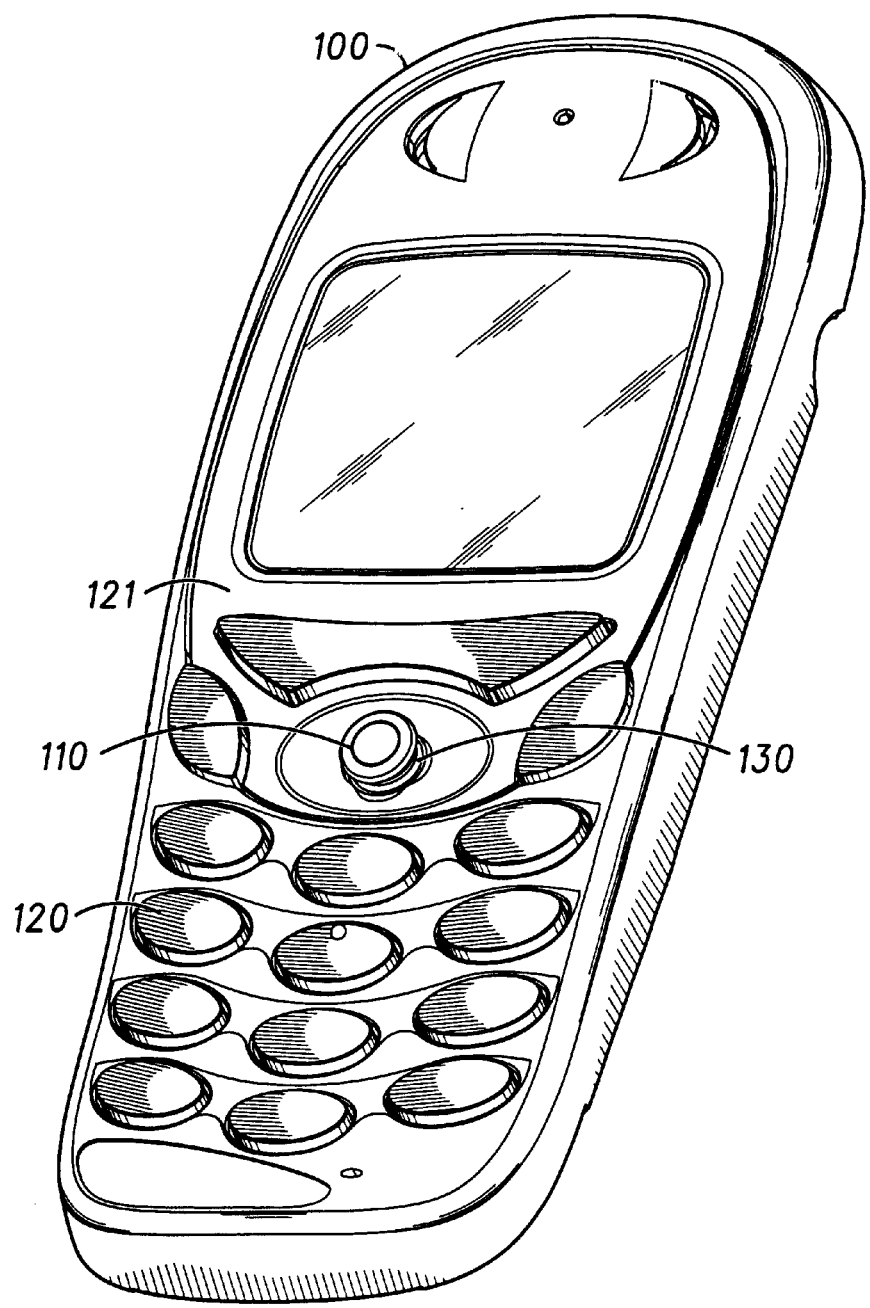
FIG. 1 is a partial perspective view of handheld cellular telephone having an integrated joystick according to an exemplary embodiment of the invention.
Figure 2:
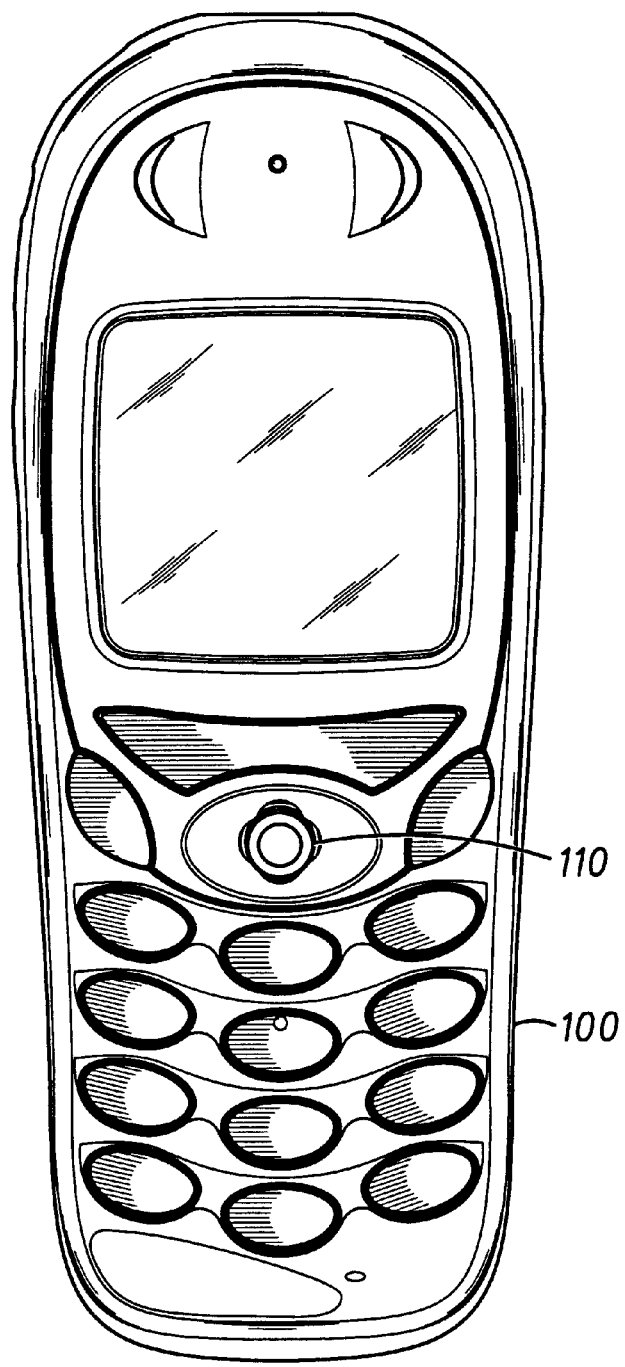
FIGS. 2 and 3 are top and side views, respectively, of FIG. 1.
Figure 3:
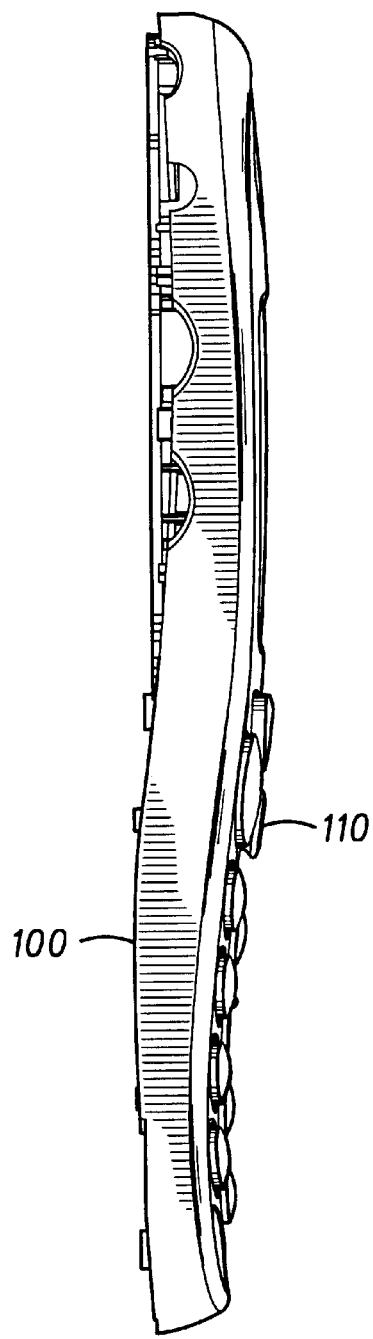

The joystick generally comprises a post or peg or stick shape pivotally coupled to the device to provide unidirectional inputs thereto. FIG. 1 illustrates a handheld cellular telephone 100 having an integrated joystick 110 according to an exemplary embodiment of the invention. FIGS. 2 and 3 are top and side views of the exemplary cellular device 100 of FIG. 1. In FIG. 1, as in many other applications, the joystick 110 is incorporated in or near keypad section 120 of the electronic device, although in other devices it may be separated therefrom.

In FIG. 1, a user operable end portion of the joystick 110 extends or protrudes through an opening 130 in a front housing 121 of device 100. The exemplary joystick 110 is partially recessed below the outer face of the housing 121 to provide a relatively low profile, as illustrated best in FIGS. 1 and 3. In some embodiments, the user operable outer end portion of the joystick does not protrude farther from the outer face of the housing than the input keys thereon to provide a flush look. In other embodiments, however, it may be desirable for the joystick to protrude farther from the outer face of the device than the input keys.

In FIGS. 1 and 2, the joystick 110 is integrated with a keypad of the device and located generally in a central portion thereof, for easy use by the either the left or right hand thumb of a user, although in other embodiments the joystick may not be centered on the device or used with a keypad.

In the present invention, the number of joystick inputs depends generally on the number of joystick switch contacts provided and also on the software configuration of the device. In one embodiment of the invention, the joystick provides inputs when rocked or pivoted in the N, NE, E, SE, S, SW, W, NW and N directions, although in other embodiments as few as a single input or many more inputs may be provided. In FIG. 2, for example, the housing opening has lobes to accommodate rocking of the joystick in specified directions, particularly the N, E, S and W directions, as is typically desirable for positioning on menus of handheld devices.

In some embodiments, another joystick input may be provided depressing the joystick axially toward the device, for example to "select" a menu option or to provide some other input.

Known joystick devices may be suitable for integration in the exemplary handheld telephone application and for performing some functions. However, preferred joysticks and contact layouts for integration in electronic devices are disclosed further below.

Figure 4:
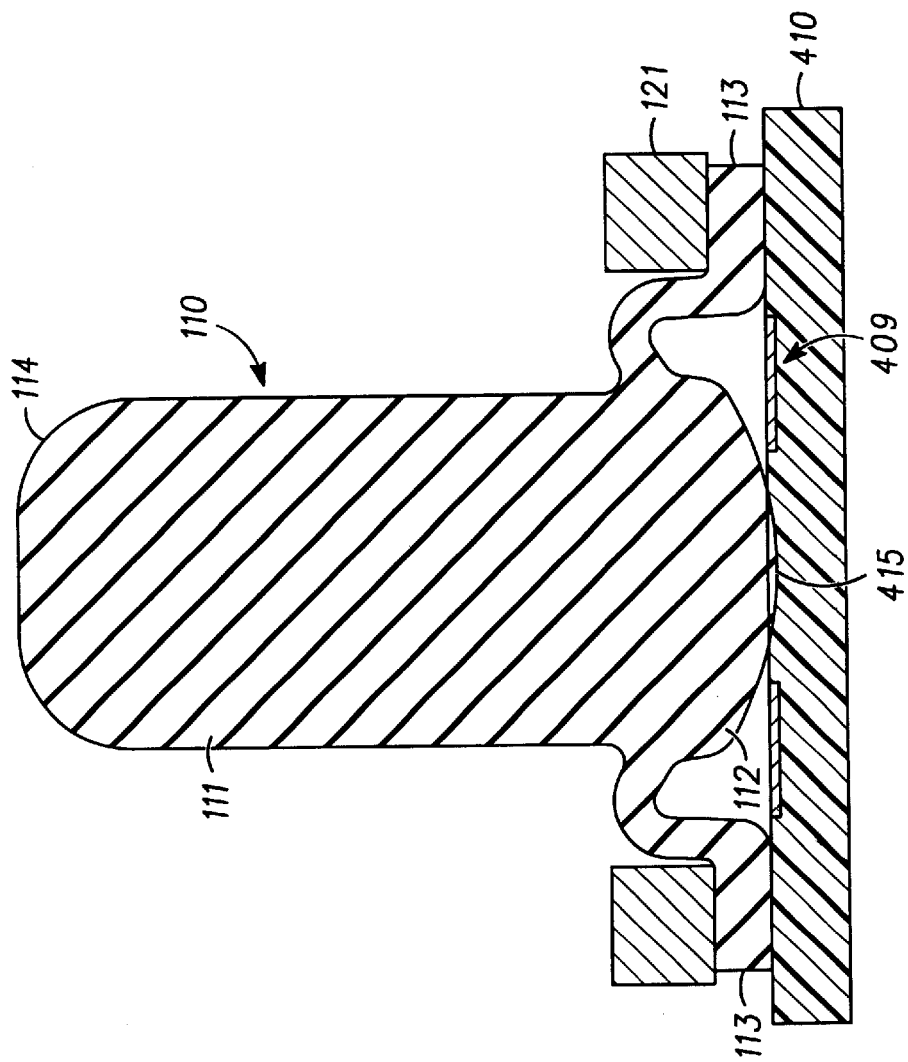
FIG. 4 is a cross-sectional view of an exemplary joystick and support member according to an exemplary embodiment of the invention.

In FIG. 4, the joystick generally comprises an end portion 112 configured for selectively contacting switch contacts incorporated in or on a support member. The support member in the exemplary embodiment is a portion of a printed circuit board (PCB) 410 of the electronic device. In other embodiments, however, the support member with the switch contacts thereon may be a discrete component, separate from the PCB, which is assembled with the PCB and other components of the device.

In one embodiment, the joystick 110 is implemented with an improved switch layout on the PCB of device 100. In FIG. 4, an inner or bottom end portion 112 of the joystick is disposed toward the PCB 410, and particularly toward a joystick contact region thereof, as discussed further below. The joystick 110 comprises a top knob section 114, an elongated post section 111 extending substantially vertically from, or perpendicular to, the PCB 410 when the joystick is in a neutral position.

In one embodiment, the joystick 110 is composed of a rubber material, wherein at least a bottom surface or portion of the bottom portion 112 thereof is conductive. In one embodiment, the joystick comprises a carbon-impregnated rubber for conductivity, wherein the entire joystick or at least the lower portion thereof is conductive. Also, in one embodiment, the lower end portion 112 of the joystick is resilient. In other embodiments, however, the joystick may be a more rigid material with a conductive lower portion of lower surface.

The bottom surface of joystick 110 may be referred to as a conductive contact surface of the joystick. The conductive contact of the joystick electrically interconnects switch contacts on the PCB when the joystick is rocked or pivoted toward corresponding inputs.

In FIG. 4, the joystick includes a lower mounting portion 113 disposed outwardly of the joystick and coupled to the lower, or rocker end, portion 112 thereof by a flexible web. The mounting portion 113 of the joystick is clamped or otherwise fastened between a housing portion 121 and the PCB 410 itself, thereby pivotally anchoring joystick 110 on the device. In other embodiments, however, the joystick may be configured differently and pivotally mounted by other known means.

In FIG. 4, generally, a plurality of directional switch contacts 409, are disposed on the joystick contact region circumferentially about a neutral position portion 415 thereof. The inner end portion 112 of joystick is disposed toward the neutral position portion 415 of the joystick contact region, without contacting any directional switch contacts, when the joystick is in the centered, neutral position.

Figure 6:
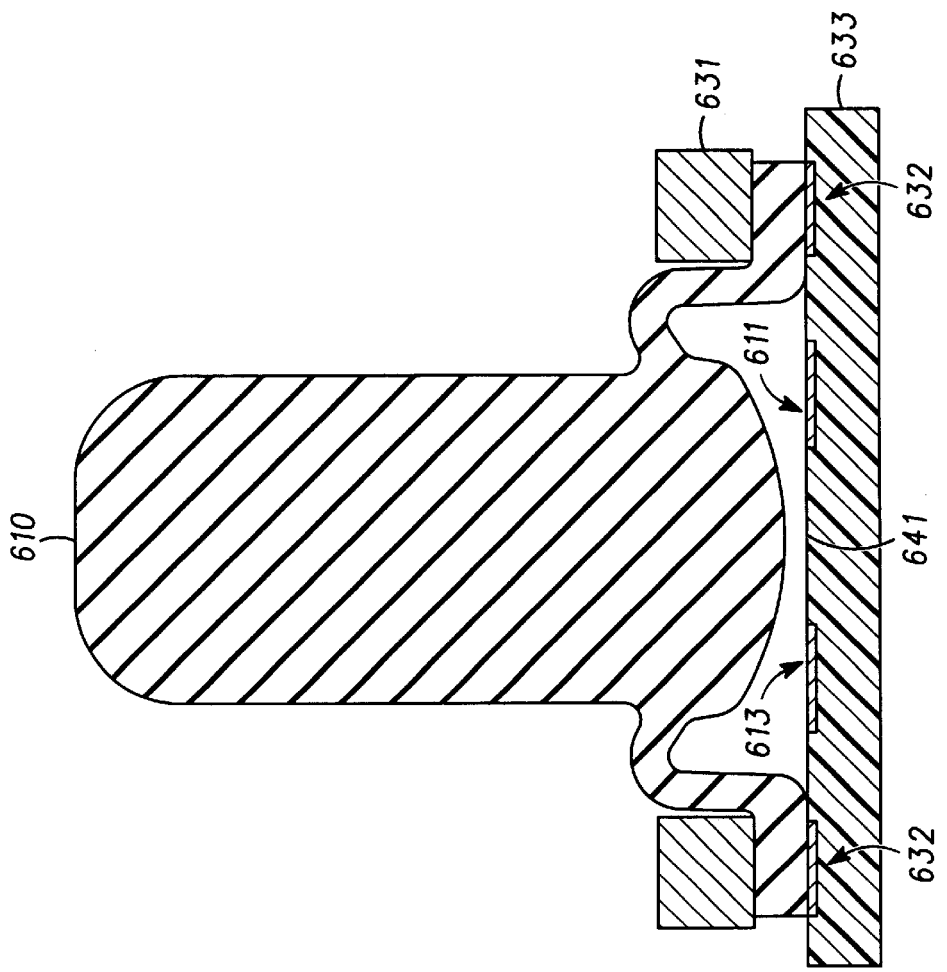
FIG. 6 is a cross-sectional view of another exemplary joystick and support member of the present invention.
Figure 7:
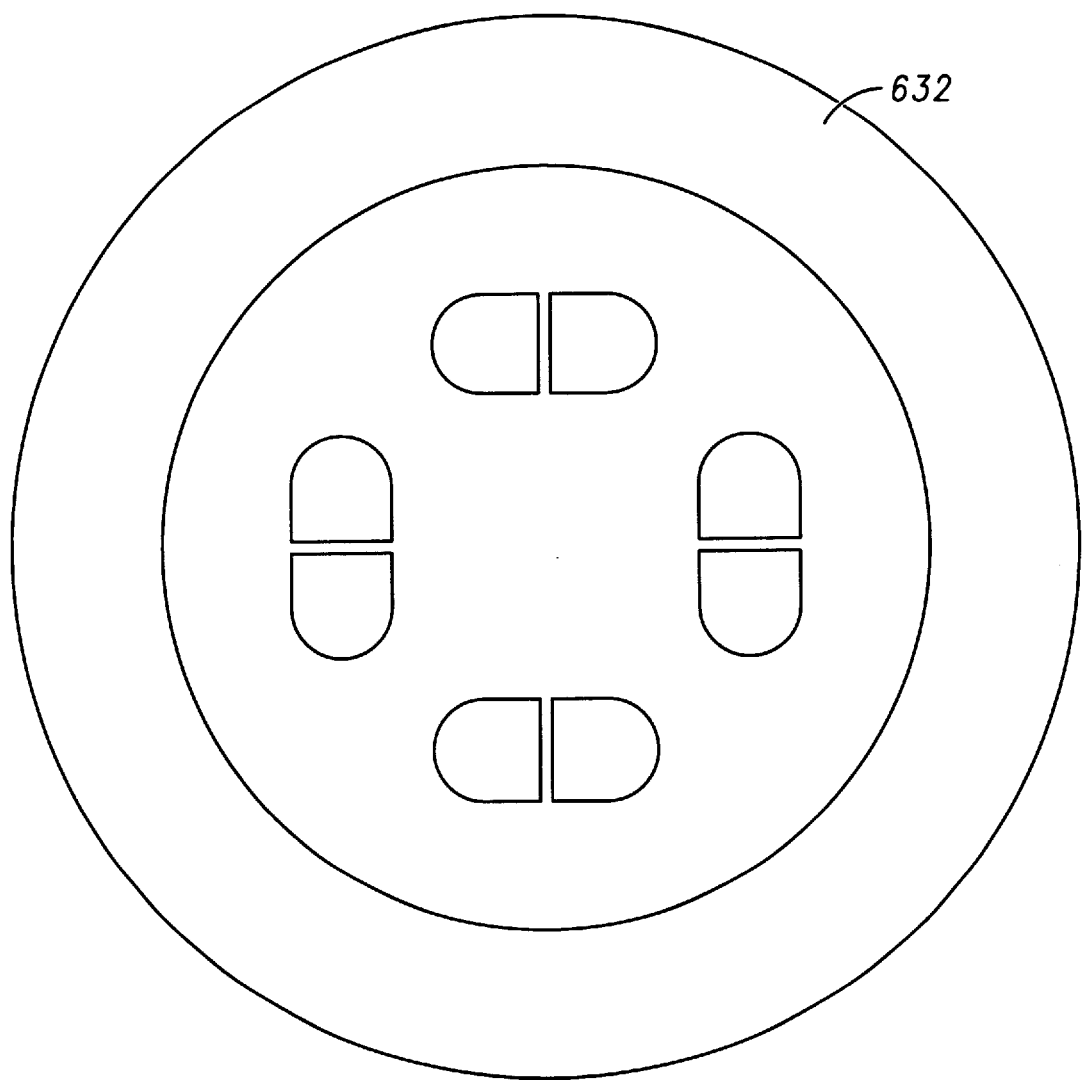
FIGS. 7–11 are alternative illustrations of joystick switch contact layouts.
Figure 8:
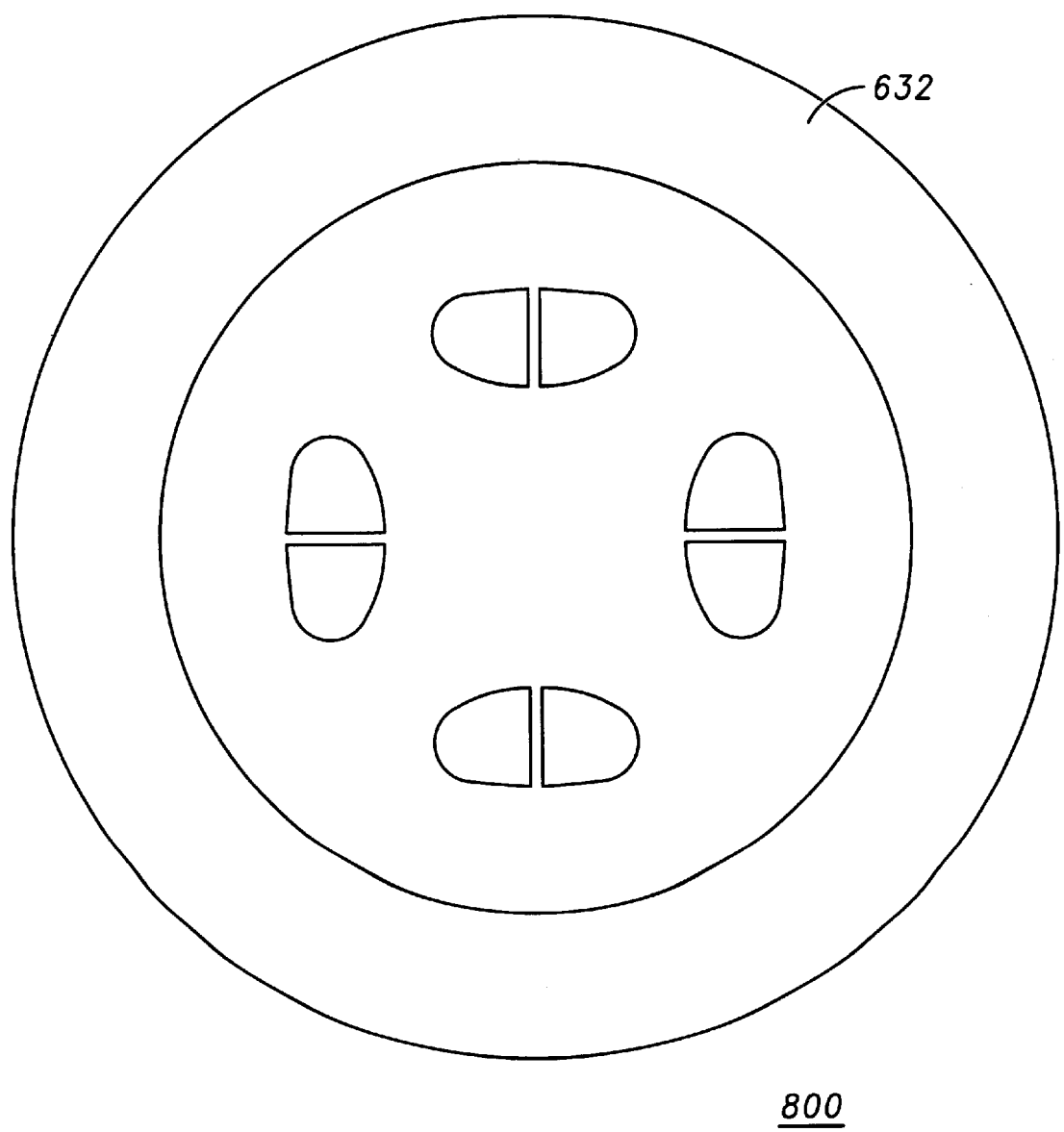
Figure 9:
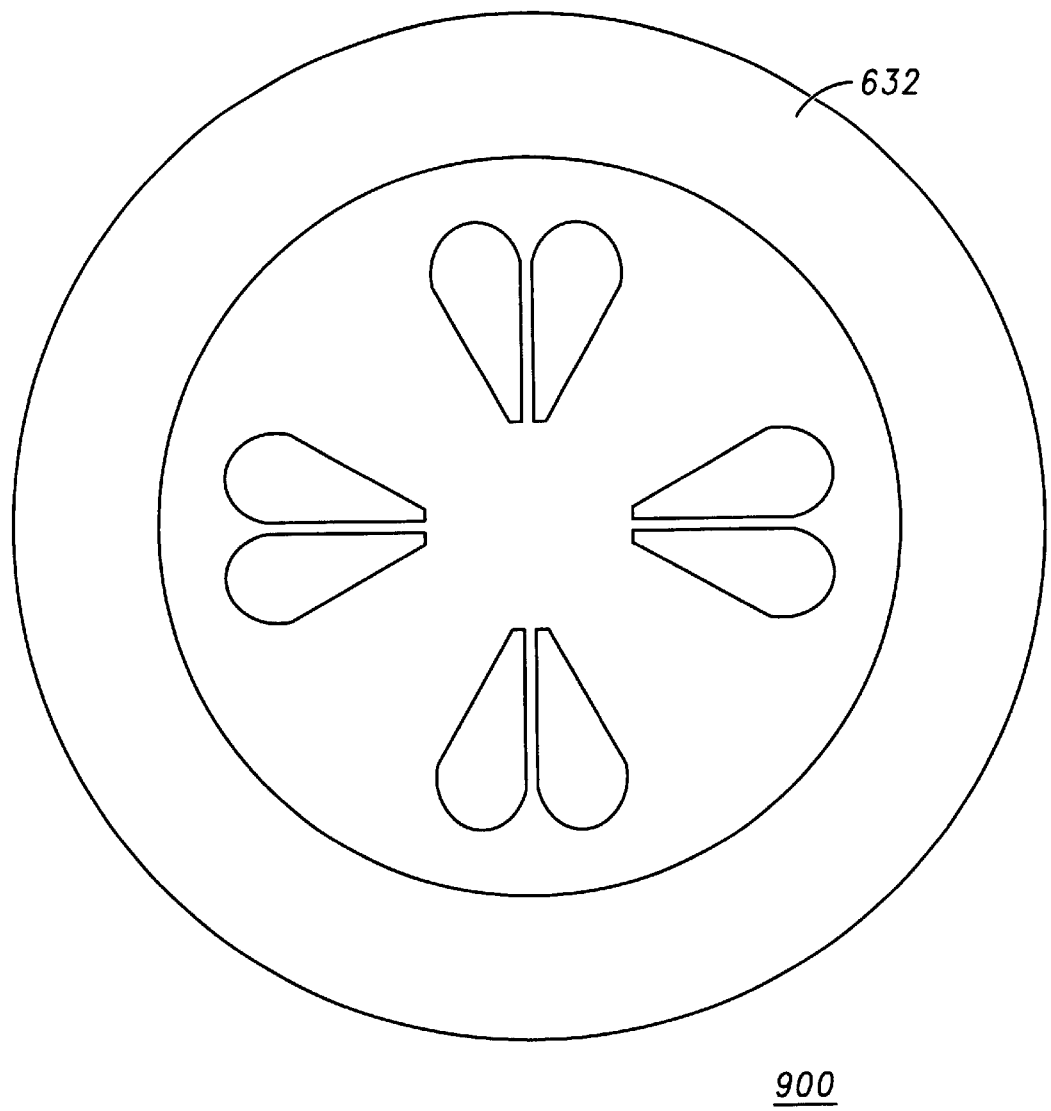

In FIG. 4, The inner end portion 112 of the joystick contacts the neutral position portion 415 of the joystick contact region, without contacting any directional switch contacts 409, when the joystick is in the centered, neutral position. In FIG. 6, the joystick is configured or mounted so that the inner end portion 112 thereof does not contact the neutral position portion 615 of the joystick contact region when the joystick is in the centered, neutral position.

In FIG. 4, when the joystick 110 is rocked or deflected by a user toward a joystick input direction, the conductive end portion 112 moves toward a corresponding one of the directional switch contacts 409 and electrically interconnects the switch contact with a ground contact, which is also in electrical contact with the conductive end portion 112 of the joystick, as discussed further below.

Input software of device is programmed to recognize the electrical interconnection, or closing, of the ground and directional switch contacts for a given joystick input.

Figure 5:
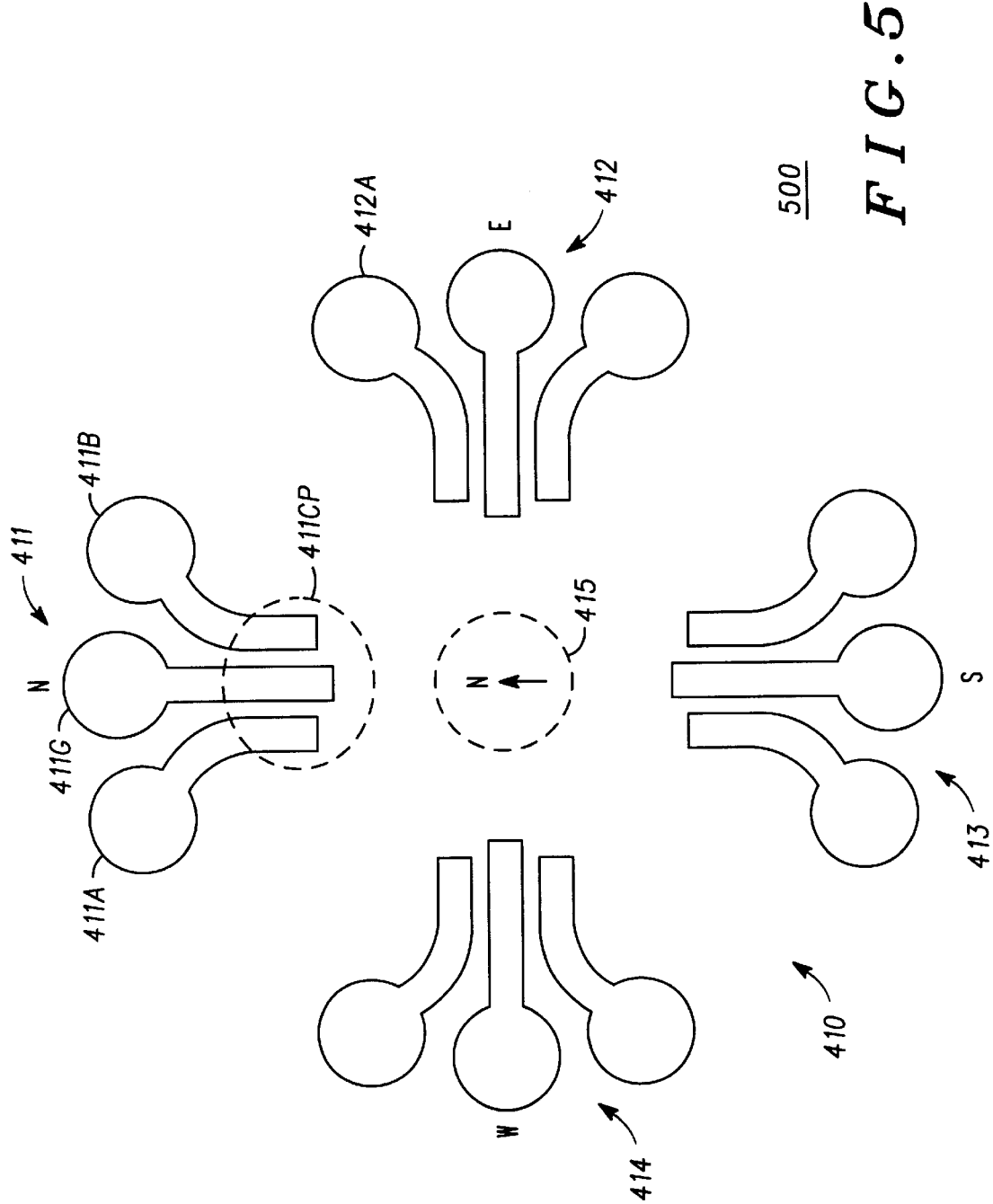
FIG. 5 illustrates a joystick switch contact layout according to an exemplary embodiment of the invention.

FIG. 5 illustrates an exemplary switch contact layout on a PCB 410. The contact layout 500 contains four switch contact sets located at different input positions. In particular, the layout 500 contains switch contact sets 411, 412, 413 and 414 located at corresponding N, E, S and W positions. The exemplary sets are spaced equally about the center of the neutral position portion 415, which is devoid of joystick contacts.

In FIG. 5, each switch contact set contains a ground contact (411G) disposed between two discrete, in other words electrically isolated, directional switch contacts $411_A$, $411_B$. Alternatively, each switch contact set may contain only a single directional switch contact along with a ground contact. In some applications, however, multiple directional switch contacts may provide more reliable operation.

In one embodiment, the ground and directional switch contacts of each switch contact set comprise a radial inner contact tail portion extending from a relatively large radial outer contact portion. The inner tail portions of the contacts are relatively closely spaced to reduce the conduction path through the conductive end portion of the joystick.

In the contact layout 500 of FIG. 5, for example, each contact of the switch contact set contains a circular portion and a narrower tail portion. The tail portions are disposed generally inwardly toward the neutral position portion 415. When the joystick 110 is rocked towards the N direction, for example, the conductive inner end portion 112 electrically interconnects the corresponding ground and directional switch contacts $411_G$ and $411_A$, $411_B$.

In one embodiment, the features of the contact layout 500 have the following approximate sizes: the radius of circular portions of switch contacts of the set 411 are approximately 0.4 mm; the length of the contact point $411_{CP}$ is approximately 1.3 mm; the width of narrow portion of the switch contacts is approximately 0.25 mm; the distance from the center of neutral position contact point 415 to the center of the circular portion of the ground contact $411_G$ is approximately 2.8 mm. In one embodiment, the contacts of the switch contact sets are composed of copper or gold or some other conductive metal. These dimensions and materials are only for one exemplary handheld cellular telephone application and are not intended to limit the invention, since the dimensions are application specific.

For perspective on the relative size of the exemplary contact layout 500 of FIG. 5, a typical popple dome has a radius of approximately 2 mm, which would extend from the center of neutral position portion 415 to the top-most end of the contact point $411_{CP}$.

In the exemplary embodiment of FIG. 5, only the N, S, E and W joystick inputs are supported by the contact layout 500, which may be sufficient for applications that do not require diagonal directional inputs, for example some cellular devices whose keypad software does not support diagonal directional inputs without software updates.

In FIG. 5, additional joystick inputs may be provided by adding additional switch contact sets, for example in one or more of the NE, SE, SW and NW positions. In applications where space is limited, the additional switch contact sets may share directional switch contacts with adjacent set. In FIG. 5, for example, a ground contact could be disposed in the NE location and the corresponding switch contact sets would utilize adjacent directional contacts $411_B$ and $412_A$. It may be desirable to make the spacing between contacts uniform, although the input software may be programmed to compensate for spacing disparities.

The elastomeric nature of the conductive end portion 112 of the exemplary rubber joystick 110 may be exploited to provide a joystick input in addition to the inputs provided by pivoting the joystick in the N, E, S and W directional inputs. Particularly, by appropriately sizing the conductive end portion 112 of the joystick and providing a suitable amount of elasticity, the conductive end portion of the joystick may be made to contact all or some of the switch contact sets by axially depressing the joystick in the neutral position.

The input software of the device may be programmed to recognize inputs when the one or more directional contacts are electrically coupled to the ground contact, taking into consideration the conductivity of the conductive end portion of the joystick. The input software may also be programmed to recognize an input resulting from the axial depression of the joystick, for example a "select" input similar to that which occurs when a mouse click selects an item pointed to by a pointer icon.

In FIGS. 6–11, each switch contact set contains at least one and preferably a pair of discrete directional switch contacts, but does not contain a ground contact. Instead, the joystick is coupled to a ground plane or contact at some other location on the support member.

In one embodiment, the ground contact is located at the neutral position portion of the joystick contact area below the conductive end portion 112 of the joystick, where it is in electrical contact therewith at all times.

In another embodiment, the neutral position portion of the joystick contact area below the conductive end portion of the joystick is devoid of joystick contacts, and one or more common ground contacts are disposed on the PCB outwardly of the directional contacts.

In FIG. 6, for example, a conductive portion of the joystick is mounted on a common ground contact 632 disposed outwardly and about the directional contacts 611 by the housing portion 631, which clamps a conductive mounting portion of the joystick to the PCB 633 in electrical contact with the ground contact 632. Then, whenever the joystick is rocked so that it makes contact with one or more directional contacts 611 of the switch contact set those switch contacts are electrically coupled to ground through the conductive bottom portion of joystick 610.

In FIG. 6, the lower conductive end portion of the joystick 610 is spaced apart from the neutral position portion 641 of the PCB when the joystick is in the neutral position or configuration. When the joystick is deflected in one of the input directions, however, the bottom thereof contacts the PCB surface in a floating ground point, so-called because it is a contact point which is grounded due to the joystick's coupling to the ground plane or contact 632 outside the main switch contact layout area.

Also, when the joystick 610 is depressed axially, the conductive elastomeric end portion thereof becomes widened as it deforms, thus contacting all four switch contact sets, which input can be detected and interpreted as a "select" or some other input by the input software of the device. In an alternative embodiment, joystick 610 can be designed and mounted so that in a neutral position it makes contact with the PCB 641 at a central contact point between the switch contact sets but without contacting any of the switch contacts.

FIGS. 7–11 illustrate alternative joystick contact layouts in accordance with alternative embodiments of the invention. Each of these alternative embodiments contains a concentric ring shaped ground contact or pad 632, which makes contact with a conductive outer portion of joystick beneath housing mounting portion, as illustrated in FIG. 6. Alternatively, instead of the continuous closed ground ring 632, the ground contact may be open-ended or may comprise one or more discrete ground contacts electrically coupled to the conductive end portion of the joystick.

In FIGS. 7–11, each joystick contact layout 600, 700, 800, 900, 1000, 1100, respectively, comprises a plurality of switch contact sets disposed about a neutral position portion of the corresponding joystick contact region. Each of the exemplary switch contact sets comprises a corresponding pair of discrete directional switch contacts. The joystick contact layouts also comprise a unitary common ground contact 632 disposed about the plurality of switch contact sets, wherein the neutral position portion of the joystick contact regions is devoid of ground contacts.

Figure 10:
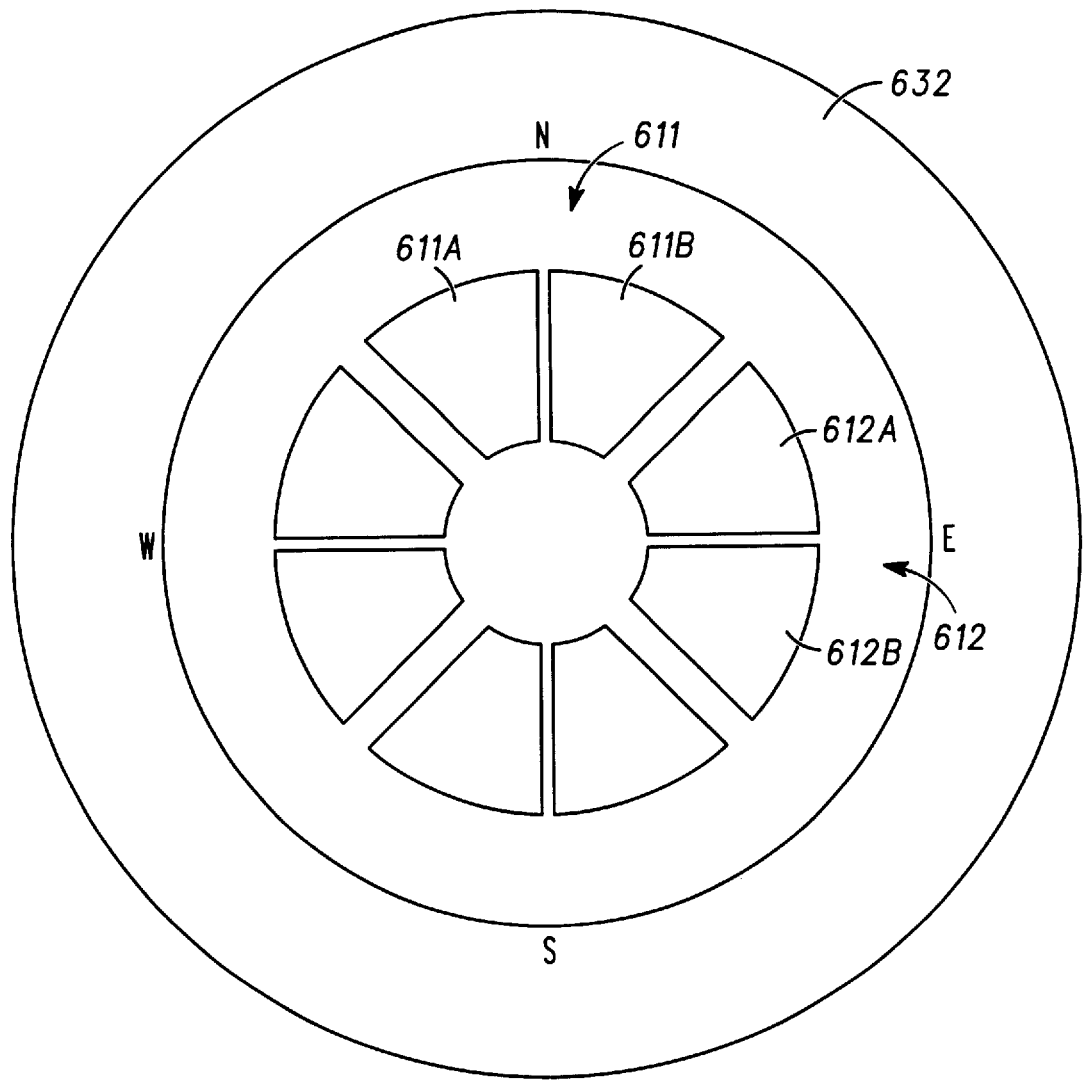

The joystick contact layout of FIG. 10 is configured for diagonal joystick inputs, wherein adjacent input share neighboring directional contacts. For example, the N directional input corresponds to switch contact set 611, which comprises directional switch contacts $611_A$ and $611_B$, and the E directional input corresponds to switch contact set 612, which comprises directional switch contacts $612_A$ and $612_B$. The diagonal NE directional input corresponds to an unidentified switch contact set comprising directional switch contacts $611_B$ and $612_A$ of the adjacent N and E directional inputs, respectively.

In operation, when the joystick is pivoted in the N input direction, directional contacts $611_A$ and $611_B$ are electrically interconnected by the conductive end portion of the joystick. Similarly, when the joystick is pivoted in the E input direction, directional contacts $612_A$ and $612_B$ are electrically interconnected. When the joystick is moved in the NE direction, directional switch contacts $611_B$ and $612_A$ are electrically interconnected. The joystick contact layouts of FIGS. 7–9 may also be used in applications where diagonal joystick inputs are desired.

Figure 11:
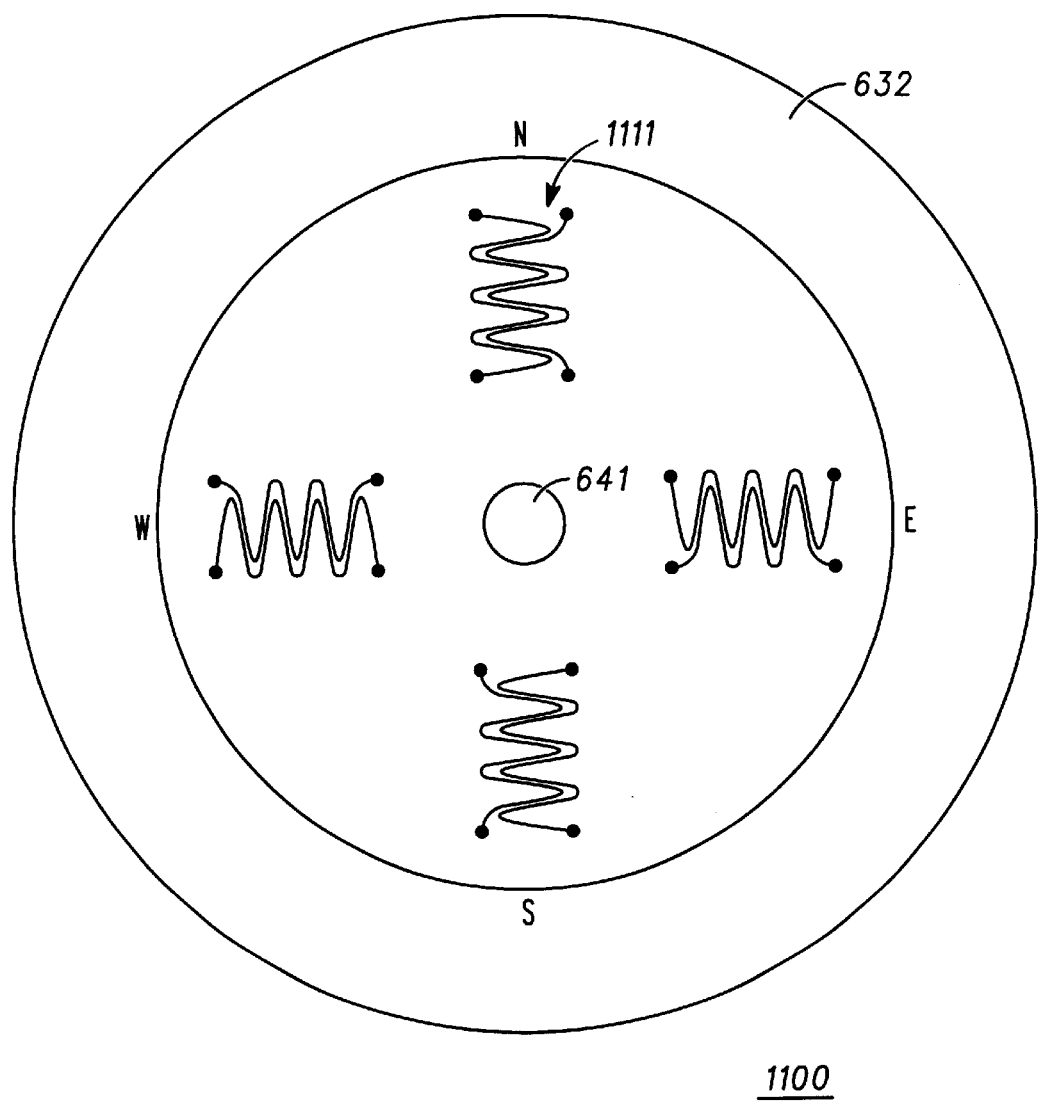

In FIG. 11, the directional switch contacts are arranged in adjacent serpentine patterns, which may provide improved input detection in some applications.

The joystick of the present invention may include button-activated switches, for example trigger style inputs, for use along with the other joystick functions discussed hereinabove.

The exemplary joystick and contact layouts of the present invention do not necessarily require extra software to be added to the phone, because it can permit navigation through the phone's menus by utilizing the existing keypad software.

While the present invention has been described in a manner enabling those of ordinary skill in the art to make and use what is presently considered to be the best modes thereof, those of ordinary skill will understand and appreciate that equivalents, modifications and variations may be made thereto without departing from the principals and scope thereof, which is to be limited not by the specific exemplary embodiments herein but by the scope and spirit of the appended claims.

What is claimed is:

1. An electronic device comprising:
    a support member having a joystick contact region with a joystick neutral position portion;
    a joystick pivotally coupled to the device, a conductive end portion of the joystick disposed toward the support member;
    a plurality of switch contact sets disposed on the contact region of the support member, the plurality of switch contact sets disposed circumferentially about the neutral position portion of the joystick contact region,
    each switch contact set comprises a pair of directional switch contacts and a ground contact.
2. The device of claim 1, the neutral position portion of the joystick contact region devoid of joystick electrical contacts.
3. The device of claim 1, the ground contact disposed between corresponding directional switch contacts, the conductive end portion of the joystick aligned with the neutral position portion of the contact region and electrically isolated from at least the directional switch contacts when the joystick is in a neutral position, whereby the directional switch contacts and ground contact of each switch contact set are electrically interconnected by the conductive end portion of the joystick when the joystick is pivoted in a corresponding direction.
4. The device of claim 3, the neutral position portion of the joystick contact region devoid of contacts of the plurality of switch contact sets.
5. The device of claim 1, the ground and directional switch contacts of each switch contact set comprising a radial inner contact tail portion extending from a relatively large radial outer contact portion.
6. The device of claim 4, a corresponding one of the plurality of switch contact sets located at N, S, E and W joystick input locations about the neutral position portion of the joystick contact region.
7. The device of claim 5, the support member comprising a portion of a printed circuit board of the device.
8. The device of claim 7,
    the conductive end portion of the joystick having a mounting portion and a rocker end portion, the mounting portion of the joystick electrically coupled to the at least one common ground contact, the joystick mounting portion disposed radially outwardly of the rocker end portion of the joystick and coupled thereto by a flexible web,
    the rocker end portion of the joystick aligned with the neutral position portion of the joystick contact region and electrically isolated from the directional switch contacts when the joystick is in a neutral position,
    whereby the switch contact sets are electrically interconnected to the at least one common ground contact by the rocker end portion of the joystick when the joystick is pivoted in a corresponding direction.
9. The device of claim 7, the at least one common ground contact is a unitary ground contact disposed at least partially about the plurality of switch contact sets.
10. The device of claim 9, the support member comprising a portion of a printed circuit board of the device.
11. The device of claim 8, a corresponding one of the plurality of switch contact sets located at N, S, E and W joystick input locations disposed about the neutral position portion of the joystick contact region.
12. The device of claim 11, the plurality of switch contact sets comprising a corresponding switch contact set at NE, SE, SW and NW locations disposed about the neutral position portion of the joystick contact region.
13. The device of claim 7, adjacent switch contact sets each sharing a directional switch contact.
14. The device of claim 7, the neutral position portion of the joystick contact region devoid of ground contacts.
15. The device of claim 7, the two discrete directional switch contacts of each switch set arranged in adjacent serpentine patterns.
16. A handheld telephone comprising:
    a support member having a joystick neutral position portion housed within the telephone;
    a joystick pivotally coupled to the telephone, an inner end portion of the joystick disposed toward the support member, the joystick having a user operable outer end portion protruding from the telephone;
    the inner end portion of the joystick aligned with the neutral position portion of the support member when the joystick is in a neutral position,
    the telephone having joystick activated inputs located at N, S, E and W positions about the joystick neutral position portion, each joystick activated input comprises a pair of directional switch contacts;

a ground contact disposed on the support member adjacent each pair of directional switch contacts, whereby the inputs are activated by pivoting the user operable outer end portion of the joystick toward corresponding joystick input directions.

17. The telephone of claim 16, the telephone having a housing with an outer face and a recessed joystick opening therein, the user operable outer end portion of the joystick protruding through the recessed joystick opening of the housing.

18. The telephone of claim 17, the housing having input keys on the outer face thereof, the user operable outer end portion of the joystick not protruding farther from the outer face of the housing than the input keys.

19. The telephone of claim 16, the neutral position portion of the support member devoid of ground contacts, the inner end portion of the joystick having a conductive portion aligned with the neutral position portion and electrically isolated from at least the directional switch contacts when the joystick is in a neutral position, whereby the pair of directional switch contacts and ground contact are electrically interconnected by the conductive portion of the joystick when the joystick is pivoted toward a corresponding input.

20. The telephone of claim 19, the ground contact is a unitary contact disposed at least partially about the directional switch contacts, the joystick having a non-pivoting conductive portion electrically coupled to the ground contact.

21. The telephone of claim 20, a ground contact located between the contacts of each pair of directional switch contacts.

22. The telephone of claim 19, the joystick comprising a conductive resilient rocker end portion, whereby an axial force applied to the joystick in the neutral position contacts the conductive rocker end portion thereof with a plurality of directional switch contacts.

23. The telephone of claim 16, the telephone having corresponding joystick activated inputs located at NE, SE, SW and NW positions about the joystick neutral position portion of the support member.

24. An electronic apparatus joystick contact layout, comprising:

a printed circuit board having a joystick neutral position portion;

a plurality of electrically isolated directional switch contacts disposed on the printed circuit board, the plurality of directional switch contacts disposed circumferentially about the neutral position portion of the printed circuit board, the plurality of directional switch contacts each arranged in discrete pairs about the neutral position portion of the printed circuit board;

a ground contact disposed on the printed circuit board proximate each of the discrete pairs of directional switch contacts.

25. The joystick contact layout of claim 24, the neutral position portion of the printed circuit board devoid of joystick contacts.

26. The joystick contact layout of claim 24, the plurality of directional switch contacts arranged at N, E, S and W positions about the neutral position portion of the printed circuit board.

27. The joystick contact layout of claim 26, the ground contact is an annular member disposed about the plurality of directional switch contacts.

28. The joystick contact layout of claim 27, the printed circuit board is a printed circuit board of the electronic device.

29. The joystick contact layout of claim 24, the ground contact is a plurality of ground contacts disposed on the printed circuit board, each of the plurality of ground contacts is disposed near a corresponding one of the plurality of directional switch contacts.

30. The joystick contact layout of claim 24, a corresponding ground contact disposed between the directional contacts of each pair.

31. The joystick contact layer of claim 30, each of the ground and directional switch contacts comprising a radial inner contact tail portion extending generally from a relatively large radial outer contact portion.

32. The joystick contact layout of claim 30, the plurality of directional switch contacts located at N, S, E and W locations about the neutral position portion of the joystick contact region.

33. The joystick contact of claim 30, the neutral position portion of the printed circuit board devoid of contacts.

34. An electronic device comprising:

a support member having a joystick contact region with a joystick neutral position portion;

a joystick pivotally coupled to the device, a conductive end portion of the joystick disposed toward the support member;

a plurality of switch contact sets disposed on the contact region of the support member, the plurality of switch contact sets disposed circumferentially about the neutral position portion of the joystick contact region, the plurality of switch contact sets each comprising a pair of directional switch contacts, at least one common ground contact disposed radially outwardly of each pair of directional switch contacts.

* * * * *